Dec. 6, 1938.                P. KREKEL                2,139,192
                        AIRCRAFT UNDERCARRIAGE
                         Filed Jan. 23, 1936
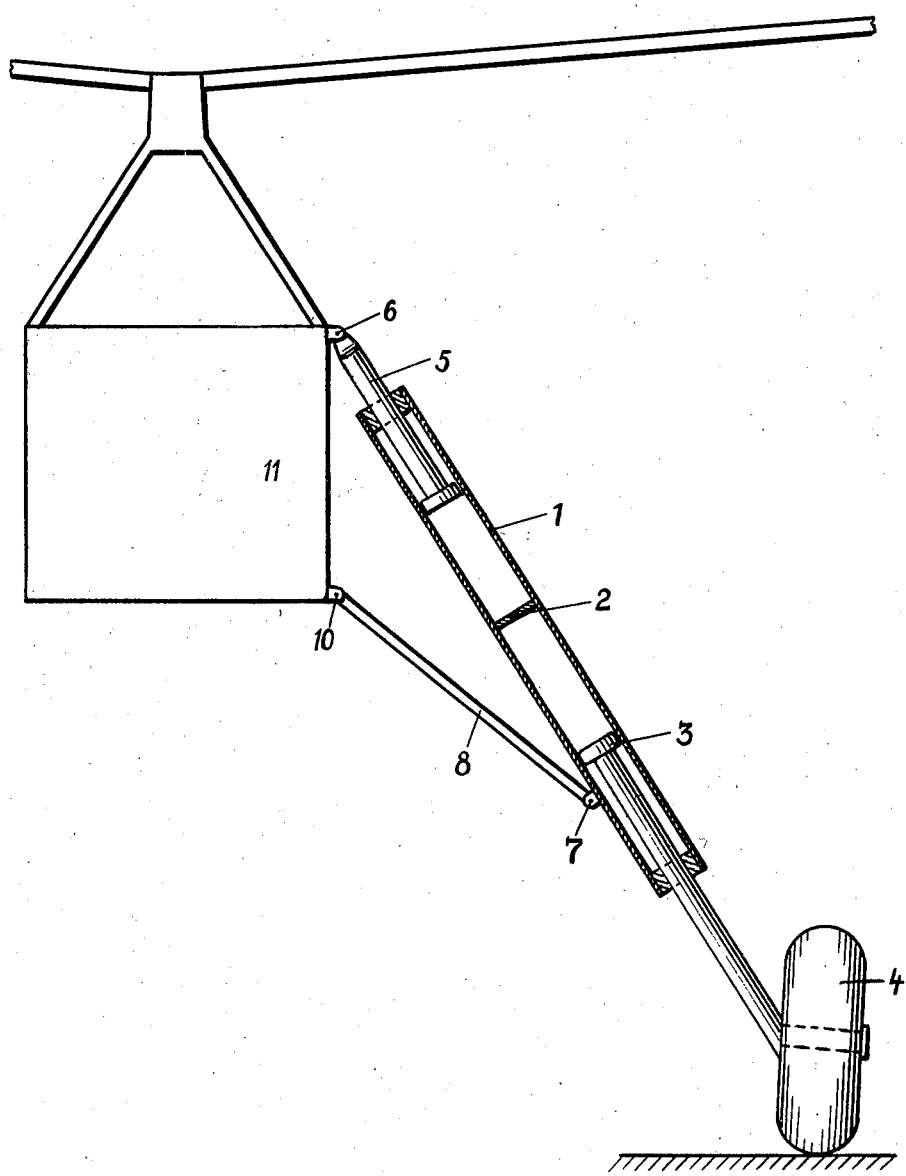
Inventor:
Paul Krekel
Attorneys:

Patented Dec. 6, 1938

2,139,192

UNITED STATES PATENT OFFICE 2,139,192

AIRCRAFT UNDERCARRIAGE

Paul Krekel, Kronberg, near Frankfort-on-the-Main, Germany

Application January 23, 1936, Serial No. 60,528
In Germany January 28, 1935

2 Claims. (Cl. 244—104)

This invention relates to aircraft undercarriages and it has for its main object to provide such an undercarriage which will allow of a long shock-absorbing stroke and in which a change in the track of the wheel, sledge-runner, float or other landing device is avoided as far as is reasonably possible even at low landing speeds.

In aircraft undercarriages that have been previously proposed, such as the so-called "three-leg undercarriage", in which the wheels are mounted on the ends of movable arms which extend out from the middle or the side of the fuselage, or from a structure beneath the fuselage, and resistance to upward movement is given by a movable and vertical or inclined shock-absorber, a displacement of the wheel outwards from the plane of symmetry of the aircraft takes place when the shock-absorber moves and thus leads to a change in the track. This change is due to the fact that the point of contact of the wheel with the ground must always be lower than the pivot-point about which the arm swings. Such an increase in the track frequently results in the tyre being pulled sideways off the hub of the wheel.

A change of track does not matter so much in the case of an aircraft having a relatively high forward speed during the landing run, but in the case of aircraft which have no or only a very low landing speed a change in the track is a disadvantage that must be reckoned with.

It has also already been proposed to connect the wheel or the like of an aircraft undercarriage to a shock-absorbing strut consisting of a tube which is able to move telescopically inside another tube and, in most cases, to arrange the shock-absorbing device inside these tubes. Usually, it has been endeavoured to arrange this wholly or partly cantilever strut vertically—seen from the front—which, in the case of aircraft with parts situated low-down, for example wings or perhaps only stub wings, does not give rise to difficulty.

If, however, there are no such parts, or it is not desirable for other reasons, it is necessary in order to obtain a track of sufficient width, when such struts are employed, to incline them outwards. If provision for absorbing shock is made in such an arrangement, however, the disadvantage of a change in track—which, of course, in this case is a reduction—again arises and might lead to the possibility of jamming of the tubes which move in each other.

The invention consists essentially in the arrangement of connecting the inclined shock-absorbing struts, on which the wheels or the like are carried, to the aircraft that they are constrained to move in such a way that this movement of the strut combines with the shock-absorbing movement as to cause the wheels or the like to move substantially in planes parallel to the plane of symmetry of the aircraft. The shock-absorbing strut may itself be made movable longitudinally and capable of swinging about a point at which it is pivoted to the aircraft as well as about a point beneath it, possibly by means of a supporting strut, and in such a way that as a result the point or surface of contact of the wheel or the like with the landing surface is able to move only in a plane which is substantially parallel to the plane of symmetry of the aircraft.

By means of this arrangement the above-mentioned disadvantages of the constructions hitherto proposed are avoided and a direct articulation of the strut even to a relatively narrow fuselage with, at the same time, a wide track, is made possible, as well as a change of track during the shock-absorbing movement being almost completely precluded. Moreover in this way relatively large shock-absorbing movements may be obtained, which are not or only obtainable with great difficulty in the case of constructions such as have been proposed hitherto.

From what has been said it will be seen that the invention is of particular importance in the case of aircraft which, in making contact with the landing-surface, have no or only a low forward speed and thus require a large shock-absorbing movement, (for example the autogiro).

In the undercarriage according to the invention, the shock-absorbing strut may be inclined and the wheel or the like connected to the lower part of the strut so as to move in a direction parallel to the strut. Thus, it may be connected to a piston which moves resiliently in the hollow strut.

In order to obviate as completely as possible the reduction of track which occurs, during the shock-absorbing movement of the strut, as a result of its inclination, the shock-absorbing strut is so constrained that it is compelled to swing outwards. The resultant movement of the wheel is therefore practically parallel to the plane of symmetry of the aircraft. Any suitable means may be adopted to constrain the strut to give the movement necessary to produce this resultant movement of the wheel.

The shock-absorbing strut may also take the form of a cylinder having a piston in each end, of which one is connected with the aircraft and the other by its free end to the wheel directly or by way of interposed shock-absorbing devices, while the cylinder is pivotally connected by means of a strut directly or indirectly to the fuselage of the aircraft or to some other suitable part below the pivot-point of the upper piston rod on the aircraft so as to be capable of swinging outwards.

In view of the bending forces such as act on the wheel and its struts on meeting the landing surface and which experience shows may be likely to lead to the possibility of jamming of the lower piston in the cylinder, regulation of the shock-absorbing forces with respect to one another is necessary in the case of such a double-piston or similar arrangement, for example by making the lower piston more resilient that the upper.

Naturally, as already mentioned, the shock-absorbing strut may be pivotally connected to the fuselage by only one movable piston or other suitable resilient member and be in direct pivotal engagement with the wheel or the like and a strut provided which, however, in this case, may not engage with the wheel or the like because a change in track would then be unavoidable. This strut should be disposed in accordance with the inclination of the shock-absorbing strut and so that a semi-cantilever structure is produced, the swinging movement of the strut in combination with the shock-absorbing action of the shock-absorbing strut causing the wheel to be displaced only practically parallel to the plane of the symmetry of the aircraft. If, for example, the shock-absorbing strut is placed more vertically, the supporting strut may be connected to it at a point nearer the wheel or the like. If, however, the strut is given a greater inclination, then, in order to move the shock-absorbing strut with respect to the fuselage of the aircraft by an amount corresponding to the extent of the shock-absorbing movement, the supporting strut must be so arranged that, on the occurrence of a shock-absorbing movement, the supporting strut causes the shock-absorbing strut to swing so that its lower end moves substantially vertically, although it will be understood that the upper outer end of the supporting strut and the upper portion of the shock-absorbing strut may actually move inwards, i. e. towards the plane of symmetry of the aircraft. The arrangement whereby the movement of the wheel or the like takes place practically parallel to the plane of symmetry may naturally be effected in other ways, for example by means of a supporting structure arranged under the fuselage to which structure the inner end of the supporting strut and the like is pivoted.

The accompanying drawing is a diagrammatic front view of part of an aeroplane and its undercarriage with parts shown in section and illustrates, as an example, one form of a struted undercarriage structure according to the invention. The half-undercarriage illustrated includes an inclined shock-absorbing strut comprising a cylinder 1 which may be separated by a partition 2 into two parts which may be either equal or unequal in diameter and length. In each end portion of the cylinder 1 is a piston, movement of which is resiliently resisted, the rod of the lower piston 3 being rigidly connected at its lower end with the landing wheel 4, while the rod of the upper portion 5 is pivotally connected at its free end to a rigid part of the aircraft at the point 6 which is conveniently disposed as high as possible, for example on the upper longeron of the fuselage 11. The cylinder 1 is pivotally connected at the appropriate connecting point 7—which, in view of the bending forces, is conveniently situated as low as possible—to the ends of two struts, of which for the sake of clearness only one 8 is illustrated, the other ends of which are pivotally connected to a point 10 on the fuselage lower than the connecting point 6.

In explaining the manner of operation of the undercarriage, the movement of the lower piston 3 may first be considered alone. This piston moves upwards into the cylinder 1 as the result of a shock acting on the wheel 4 from below and the wheel would, because of the inclined position of the whole cylinder-piston-system, move inwards, i. e. towards the plane of symmetry of the aircraft.

If now the upper cylinder-piston-system is considered alone, as a result of a shock acting on the wheel the piston rod 5 is moved into the cylinder 1. The point 7 moves upwards on an arc about the point 10 and the whole cylinder-piston-system, and therefore also the wheel 4 experiences a swing about the point 6 with the result that the wheel would move away from the plane of symmetry of the aircraft, that is "outwards".

In order to cause the wheel to execute, on the occurrence of a landing shock, a movement which is exactly or approximately parallel to the plane of symmetry of the aircraft, it is merely necessary to provide for an appropriate resistance to movement of each of the two piston systems. This will in most cases be effected by appropriate selection and arrangement of a suitable pressure-medium or device, for example air, oil, rubber, helical springs or some other yielding means, the force-stroke curves of which may be made to follow an appropriate course by means of constructional expedients, which can easily be determined by preliminary experiments. When oleo shock-absorbing is employed alone, or in addition to other means, it will in most cases be necessary to provide an oil passage for one or both pistons, the cross-section of which may be varied during the stroke of the piston, in order to obtain the desired nearly constant resistance to movement and a constant track. It is also possible in this way, in order to decrease the bending forces on the sections near 7 to arrange for a tendency to change of track which, however, is resisted by the friction at the point of contact of the wheel with the ground so that an appropriate lateral force is produced. Finally the two pistons may be connected together by suitable hydraulic or mechanical transmission means, for example by oil, rods, cable, or the like, in such a way that the desired forces on the two pistons are obtained.

In most cases, however, it will be possible, even with possible inequalities of movement, to manage without such a connection because, as may be easily determined, any possible lag or advance of one piston with respect to the other piston tends to give automatic compensation so that at the point of contact of the wheel with the ground there is always produced a force which is transverse to the wheel and which affects the movements of the two pistons with respect to one another in such a way that the main purpose of the invention, namely the maintaining of a constant wheel track with an inclined shock-absorbing system, is in this way aided.

Having now particularly described and ascertained the nature of my said invention and in what manner the same is to be performed, I declare that what I claim is:—

1. In an undercarriage for aircraft, a strut capable of longitudinal expansion or contraction and inclined with respect to the longitudinal vertical plane of the aircraft, said strut comprising a central member having cylinder means therein, an element pivoted to the body of the aircraft and to said central member, a ground-engaging member, and pistons engaged in said cylinder means one pivoted to the body of the aircraft and the other connected to the ground-engaging member, said pistons yieldingly resisting contraction of said structure.

2. In a device as claimed in claim 1, said ground-engaging member being rigidly connected to the second piston.

PAUL KREKEL.